(12) United States Patent
Sinharay et al.

(10) Patent No.: US 12,480,912 B2
(45) Date of Patent: Nov. 25, 2025

(54) METHOD AND SYSTEM FOR FASTER ASSESSMENT OF SOUND SPEED IN FLUIDS USING COMPRESSIVE SENSING TECHNIQUE

(71) Applicant: Tata Consultancy Services Limited, Mumbai (IN)

(72) Inventors: Arijit Sinharay, Kolkata (IN); Raj Rakshit, Kolkata (IN); Supriya Gain, Kolkata (IN); Tapas Chakravarty, Kolkata (IN); Subhadeep Basu, Kolkata (IN); Achanna Anil Kumar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 620 days.

(21) Appl. No.: 17/936,210

(22) Filed: Sep. 28, 2022

(65) Prior Publication Data

US 2023/0134893 A1    May 4, 2023

(30) Foreign Application Priority Data

Oct. 29, 2021   (IN) .............................. 202121049707

(51) Int. Cl.
*G01N 29/024*   (2006.01)
*G01N 29/46*   (2006.01)

(52) U.S. Cl.
CPC ........... *G01N 29/024* (2013.01); *G01N 29/46* (2013.01)

(58) Field of Classification Search
CPC .... G01N 29/024; G01N 29/46; G01N 29/348; G01N 29/4472; G01H 5/00
See application file for complete search history.

(56) References Cited

U.S. PATENT DOCUMENTS

| 4,111,055 A | * | 9/1978 | Skidmore, III | .... G01N 29/0627 73/620 |
| 8,176,783 B2 |  | 5/2012 | Sinha |  |

(Continued)

FOREIGN PATENT DOCUMENTS

| CN | 107590819 A | 1/2018 |  |
| WO | WO-2020217168 A1 * | 10/2020 | ............. G01K 11/26 |

OTHER PUBLICATIONS

Bright, Ido et al., "Compressive sensing-based machine learning strategy for characterizing the flow around a cylinder with limited pressure measurements", Physics of Fluids, Date: 2013, Publisher: Research Gate, https://www.math.purdue.edu/~lin491/pub/GLIN-13-POF.pdf.

*Primary Examiner* — Shelby A Turner
*Assistant Examiner* — Yaritza H Perez Bermudez
(74) *Attorney, Agent, or Firm* — Finnegan, Henderson, Farabow, Garrett & Dunner, LLP

(57) ABSTRACT

Use of Swept Frequency Acoustic Interferometry (SFAI) is becoming ubiquitous in taking non-invasive measurements of fluid parameters like sound speed, sound attenuation and density of fluid. But measurement using SFAI is relatively slow as one needs to sweep a wide range of frequencies and for each probing frequency one needs to wait for settling time. Further, SFAI works well only on steady flow as sudden change in fluid flow destroys resonance condition, thereby making it unsuitable for flowing fluid. Present application provides method and system for faster assessment of sound speed in fluids using compressive sensing technique. The system first uses random samples in defined frequency scanning range of frequency sweep signal for generating pseudo analytic signal vector. The system then estimates pulse-echo view by applying compressive sensing technique over pseudo analytic signal vector. Thereafter, (Continued)

system calculates sound speed in fluid using pulse-echo view and pre-defined sound speed calculation formula.

17 Claims, 5 Drawing Sheets

(56) References Cited

U.S. PATENT DOCUMENTS

| | | |
|---|---|---|
| 10,697,938 B2 | 6/2020 | Cattaneo et al. |
| 2009/0078050 A1* | 3/2009 | Sinha ................ G01N 29/4463 |
| | | 73/632 |
| 2012/0055264 A1* | 3/2012 | Sinha ........................ G01F 1/74 |
| | | 73/861.25 |

* cited by examiner

METHOD AND SYSTEM FOR FASTER ASSESSMENT OF SOUND SPEED IN FLUIDS USING COMPRESSIVE SENSING TECHNIQUE

PRIORITY CLAIM

This U.S. patent application claims priority under 35 U.S.C. § 119 to: Indian Patent Application No. 202121049707, filed on Oct. 29, 2021. The entire contents of the aforementioned application are incorporated herein by reference.

TECHNICAL FIELD

The disclosure herein generally relates to fluid quality estimation, and, more particularly, to a method and a system for faster assessment of sound speed in fluids using compressive sensing technique.

BACKGROUND

Fluid quality assessment is a key requirement for many industries. Acoustic property like sound speed in fluid serves as a reliable marker for assessing the quality of the fluid as aging or adulteration would alter the sound speed in the fluid instantly. Nowadays, acoustic interferometry (also referred as Swept Frequency Acoustic Interferometry (SFAI)) has been widely used as a major noninvasive measurement tool for characterizing fluids. It calculates fluid parameters like sound speed, attenuation, and density from outside a container wall containing the fluid by implementing a frequency sweep. Basically, SFAI technique probes the fluid kept in the container at different frequencies over a wide frequency range and records the response of the liquid. While performing the frequency sweep, several resonance conditions are hit and thus a resonance spectrum containing all the required information is produced that further helps in characterization of the fluid (i.e., sound speed in it, sound attenuation, and density). The SFAI uses a narrowband filtering to significantly enhance the signal quantity as compared to traditional pulse-echo based measurements.

However, the measurement using the SFAI technique is relatively slow as there is a need to sweep a wide range of frequencies. Further, for each probing frequency, there exist some settling time that is governed by a narrow band filter to avoid recording transients, thereby putting a fundamental limit on how fast the frequency sweep can be performed. Though processing of the data can be made arbitrarily fast, one cannot take the frequency sweep and record the response arbitrarily fast as this is tied with physical/fundamental limits posed by the required measurement resolution and filter bandwidth as mentioned earlier.

Additionally, in cases of flowing fluid (e.g., in oil and gas pipelines), sometimes sudden change in flow of the fluid destroys the resonance condition created using the SFAI technique. Thus, a faster measurement is preferred because of possibility of change in flow of the liquid at any time.

SUMMARY

Embodiments of the present disclosure present technological improvements as solutions to one or more of the above-mentioned technical problems recognized by the inventors in conventional systems. For example, in one aspect, there is provided a processor implemented method for faster assessment of sound speed in fluids using compressive sensing technique. The method comprises receiving by a sound speed assessment system via one or more hardware processors, one or more excitation signals and one or more quadrature signals generated corresponding to the one or more excitation signals from a fluid container containing a fluid; creating, by the sound speed assessment system via one or more hardware processors, a pseudo analytic signal vector based, at least in part, on the one or more excitation signals and the one or more quadrature signals using a pre-defined vector creation formula; estimating, by the sound speed assessment system via one or more hardware processors, a pulse-echo view by applying a compressive sensing technique over the created pseudo analytic signal vector, wherein the pulse-echo view is a vector; determining, by the sound speed assessment system via one or more hardware processors, whether the estimation of the pulse-echo view is successful based on a pre-defined criteria; and calculating, by the sound speed assessment system via one or more hardware processors, a sound speed in the fluid based on the determination using the pulse-echo view and a pre-defined sound speed calculation formula.

In another aspect, there is provided a sound speed assessment system for faster assessment of sound speed in fluids using compressive sensing technique. The system comprises a memory storing instructions; one or more communication interfaces; and one or more hardware processors coupled to the memory via the one or more communication interfaces, wherein the one or more hardware processors are configured by the instructions to: receive one or more excitation signals and one or more quadrature signals generated corresponding to the one or more excitation signals from a fluid container containing a fluid; create a pseudo analytic signal vector based, at least in part, on the one or more excitation signals and the one or more quadrature signals using a pre-defined vector creation formula; estimate a pulse-echo view by applying a compressive sensing technique over the created pseudo analytic signal vector, wherein the pulse-echo view is a vector; determine whether the estimation of the pulse-echo view is successful based on a pre-defined criteria; and calculate a sound speed in the fluid based on the determination using the pulse-echo view and a pre-defined sound speed calculation formula.

In yet another aspect, there are provided one or more non-transitory machine-readable information storage mediums comprising one or more instructions which when executed by one or more hardware processors cause a method for faster assessment of sound speed in fluids using compressive sensing technique. The method comprises receiving, by a sound speed assessment system via one or more hardware processors, one or more excitation signals and one or more quadrature signals generated corresponding to the one or more excitation signals from a fluid container containing a fluid; creating, by the sound speed assessment system via one or more hardware processors, a pseudo analytic signal vector based, at least in part, on the one or more excitation signals and the one or more quadrature signals using a pre-defined vector creation formula; estimating, by the sound speed assessment system via one or more hardware processors, a pulse-echo view by applying a compressive sensing technique over the created pseudo analytic signal vector, wherein the pulse-echo view is a vector; determining, by the sound speed assessment system via one or more hardware processors, whether the estimation of the pulse-echo view is successful based on a pre-defined criteria; and calculating, by the sound speed assessment system via one or more hardware processors, a sound speed in the fluid based on the determination using the pulse-echo view and a pre-defined sound speed calculation formula.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
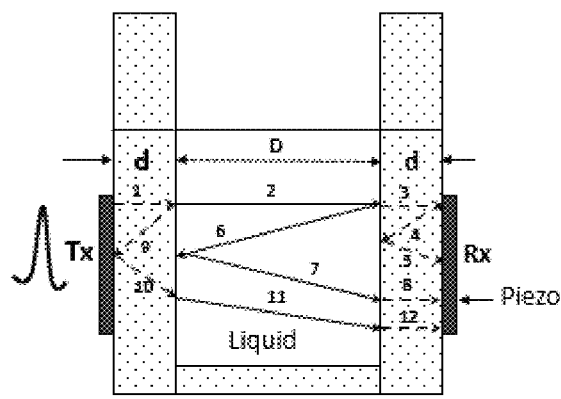
FIG. 1 is an example representation of a pulse propagation diagram created corresponding to a transformed time domain view, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Nowadays, quick quality estimation of fluid is getting a lot of attention in the field of research due to its wide application area. As discussed previously, Swept Frequency Acoustic Interferometry (SFAI) is a well-known noninvasive technique for taking measurements of fluid's acoustic parameters like sound speed in fluid, sound attenuation, and density of fluid as these parameters help in fluid characterization or in other case assessing the quality of the fluid. In case the values obtained for the parameters are found to be deviated from the supposed values, the fluid can be considered as adulterated.

In the SFAI technique by Sinha et al. (e.g., refer "T. L. Szabo, Diagnostic ultrasound imaging: inside out, Academic Press, 2004"), authors probed the fluid kept in a container at different frequencies using piezo crystal and records the response of the fluid. The probing of the fluid over a wide frequency range effectively produced a resonance spectra that contained all the required information needed to characterize the fluid (i.e., sound speed, sound attenuation, density of the fluid). The authors managed to improve the signal-to-noise (S/N) ratio significantly. However, the measurement of fluid parameters using standard SFAI technique requires a lot of settling time as discussed previously, thereby making it slow.

Though the standard SFAI technique has shown substantially improved performance in ensuring accuracy of the measurement, but it works well only on steady flows. However, techniques that can ensure faster measurement on flowing fluid while reducing the amount of raw data that is being produced is still to be explored.

Embodiments of the present disclosure overcome the above-mentioned disadvantages, such as slower measurement, higher computational expense, etc., by providing a system and a method for faster assessment of sound speed in fluids using compressive sensing technique. More specifically, the system and the method of the present disclosure follow a compressive sensing technique for achieving faster SFAI measurement that further helps in quicker determination of sound speed in the fluid. Basically, the system and the method help in quicker characterization of fluids while producing less amount of raw data, thereby making it helpful in applications where available resources are minimum. For example, in gas and oil pipelines where most of the installed sensors are battery powered, the collected data is either saved on a local memory unit or transmitted to a central server for post processing. In these scenarios, less amount of raw data would be really helpful in recording the data for longer time while also saving battery power in transmission time.

To understand the working of the system, the working of the standard SFAI technique is explained first as the system works on the principles of standard SFAI technique.

As discusses earlier, in standard SFAI technique, the sound speed, attenuation, and fluid density are measured from outside a container wall in which the fluid is placed using piezo electric transducers. So, suppose fluid is kept in a rectangular container with 'D' as inner wall-to-wall distance and 'd' as wall thickness, then the container walls at the opposite side can be considered as fixed boundaries. Now, if the fluid kept in the rectangular container is excited with a continuous wave and frequency of the continuous wave is increased over time in a frequency range say f={$f_{start}$, ... $f_{stop}$}, then whenever an integer multiple of half wavelength fits inside D, the fluid exhibits creation of standing wave i.e., the resonance. So, resonance happens when:

$$D = n * \frac{\lambda}{2} \qquad \text{eqn (1),}$$

where n=1, 2 . . . any integer,
$\lambda$ represents the wavelength of excitation frequency.

As its already known in the art that wavelength can be computed based on sound speed in liquid and the frequency range using $\lambda = v/f$, where v is sound speed in liquid. So, the sound speed in liquid can be calculated by obtaining consecutive resonance conditions:

$$v = 2D\Delta f \qquad \text{eqn (2)},$$

where $\Delta f$ represents the spacing between consecutive resonance peaks given by $\Delta f = f_i - f_{i+1}$ and $f_i$ represents $i^{th}$ resonance peak.

Further, phase sensitive measurement is taken to get excitation and quadrature components. To obtain the excitation component (I), response of a frequency excitation is multiplied with the excitation frequency itself and then lowpass filtering is performed. Thereafter, the quadrature component (Q) is obtained by first multiplying a 90-phase shifted version of the excitation signal with the response at the same time and then performing lowpass filtering.

Once the excitation and quadrature component are available for the excitation frequency, the excitation and quadrature components are combined to obtain a magnitude response M for that excitation frequency using:

$$M = \sqrt{I^2 + Q^2} \qquad \text{eqn(3)}$$

Thereafter, once the measurement of the Magnitude for each excitation frequency is obtained, a Magnitude vs Frequency plot is generated to form the required resonance or SFAI spectra that further helps in determining sound speed and sound attenuation information as discussed previously.

The SFAI spectra that is generated is in frequency domain but as per the prior knowledge, the same SFAI spectra can also be transformed to time-domain (hereinafter referred as Transformed Time Domain (TTD)) and equivalent pulse-echo pictures can be generated from the same I, Q measurement data.

For TTD, first an analytical signal Z is formed by combining the I and Q using:

$$Z = I + jQ \qquad \text{eqn(4)}$$

Thereafter, a pseudo analytic signal $Z_c$ is created based on the analytical signal Z using:

$$Z_c = jZ^* \qquad \text{eqn(5)},$$

Where $Z^*$ represents complex conjugate of Z.

Further, magnitude spectrum (M) can be evaluated from $Z_c$ just by taking the magnitude of $Z_c$ using:

$$M = |Z_c| = \sqrt{I^2 + Q^2} \qquad \text{eqn(6)}$$

Thereafter, the Fourier Transform on $Z_c$ is taken for automatically transforming the data in time domain. The Fourier transform on $Z_c$ provides a TTD view that is similar to a straightforward pulse-echo type measurement where a transmitted pulse from transmitter piezo Tx goes through a plurality of paths due to reflections/transmission at interface boundaries to arrive at receiver piezo Rx. As there can be multiple paths for the transmitted pulse to arrive at Rx, unique shortest path(s) with corresponding time of arrivals can be determined by looking at a pulse propagation diagram created corresponding to the TTD view. An example representation of a pulse propagation diagram created corresponding to a TTD view is shown with reference to FIG. 1.

As seen in FIG. 1, a first shortest path can be 1, 2, 3 and the corresponding pulse arrival time $T_1$ for the lead pulse can be calculated using:

$$T_1 = t_w^1 + t_l^2 + t_w^3 = 2t_{wall} + t_{liquid} \qquad \text{eqn (7)},$$

Where w represents path through container wall,
l represents path through liquid,
Superscripts 1,2 etc. represents direction of path taken as indicated in FIG. 1, Thus, $t_w^1$ and $t_w^3$ represents sound travel time in container wall for path 1 and path 3, respectively
$t_l^2$ represents sound travel time in liquid along path 2,
$t_{wall}$ represents sound travel time in container wall,
$t_{liquid}$ represents sound travel time in liquid, $$t_w^1 = t_w^3 = t_{wall}, \text{ and } t_l^2 = t_{liquid}.$$

Further, if $v_{wall}$ is speed of sound in wall material of the container and $v_{liquid}$ is the speed of sound in liquid, then $t_{wall}$ and $t_{liquid}$, using eqn (5) and eqn (6) can be expressed as:

$$t_{wall} = \frac{d}{v_{wall}} \qquad \text{eqn (8)},$$

$$t_{liquid} = \frac{D}{v_{liquid}} \qquad \text{eqn (9)},$$

where d represents the wall thickness, and
D represents inner wall-to-wall distance.

Thereafter, if eqn(8) and eqn(9) are substituted in eqn(7), we get:

$$T_1 = 2t_{wall} + t_{liquid} \qquad \text{eqn(10)}$$

Further, lead pulses that traverse the liquid path multiple times are observed. For example, as seen in FIG. 1, a path 1, 2, 6, 7 and 8 makes a pulse that traverses the liquid three times and a pulse arrival time $T_2$ for the lead pulse can be determined using:

$$T_2 = t_w^1 + t_l^2 + t_l^6 + t_l^7 + t_w^8 = 2t_{wall} + 3t_{liquid} \qquad \text{eqn(11)},$$

Where $t_w^1 = t_w^8 = t_{wall}$, and $$t_l^2 = t_l^6 = t_l^7 = t_{liquid}.$$

Further, if eqn(6) is subtracted from eqn(11), we will get:

$$T_2 - T_1 = 2t_{liquid} \qquad \text{eqn(12)}$$

Thereafter, if eqn(9) is substituted in eqn(12) and then $v_{liquid}$ can be given as:

$$v_{liquid} = \frac{2*D}{T_2 - T_1} \qquad \text{eqn (13)}$$

As can be seen in eqn(13), sound speed in liquid can now be obtained only by observing time of arrival for first two lead pulses ($T_1$ & $T_2$) and with prior knowledge of dimension D. This determination of the sound speed in liquid based on the time of arrival for first two lead pulses and the dimension D forms the basis for application of compressive sensing technique in standard SFAI. The eqn(13) hereinafter referred as pre-defined sound speed calculation formula as its already known through standard SFAI technique.

In the present disclosure, the system ensures faster assessment of sound speed in liquid by providing a sound speed assessment system (explained in detail with reference to FIGS. 2 and 3) that calculates the sound speed using some random samples instead of all the samples that are provided in a defined frequency scanning range. For doing so, the sound speed assessment system first creates a pseudo analytic signal vector based on excitation signals and corresponding quadrature signals using a pre-defined vector creation formula. The excitation signals and the corresponding quadrature signals are obtained by exciting frequencies associated with some random samples selected from a plurality of samples available in a defined frequency scanning range of a full frequency sweep signal. Secondly, the sound speed assessment system creates a pulse-echo view by applying a compressive sensing technique over the created pseudo analytic signal vector. Thirdly, the sound speed assessment system calculates sound speed in the fluid using the pulse-echo view and the pre-defined sound speed calculation formula.

Referring now to the drawings, and more particularly to FIGS. 1 through 7B, where similar reference characters denote corresponding features consistently throughout the figures, there are shown preferred embodiments and these embodiments are described in the context of the following exemplary system and/or method.

Figure 2:
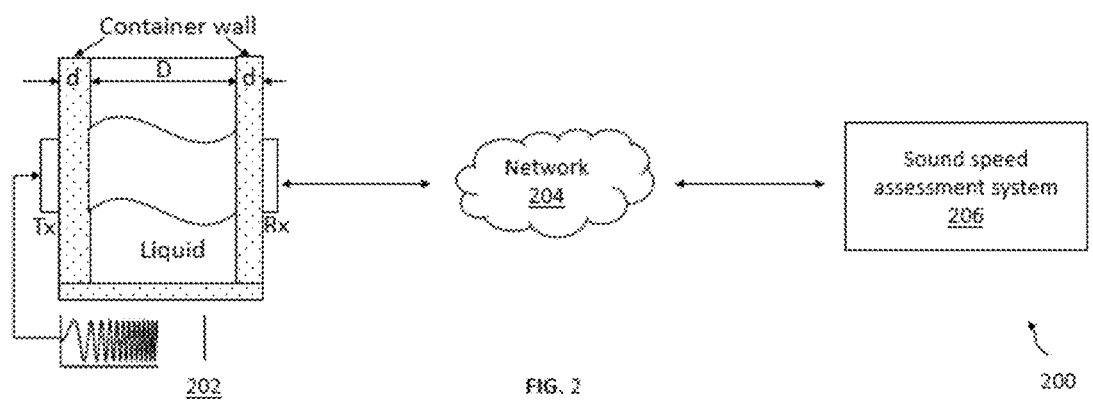
FIG. 2 is an example representation of an environment, related to at least some example embodiments of the present disclosure.

FIG. 2 illustrates an exemplary representation of an environment 200 related to at least some example embodiments of the present disclosure. Although the environment 200 is presented in one arrangement, other embodiments may include the parts of the environment 200 (or other parts) arranged otherwise depending on, for example, selecting random samples, exciting frequencies, etc. The environment 200 generally includes a fluid container 202 containing and a sound speed assessment system 206, each coupled to, and in communication with (and/or with access to) a network 204.

The network 204 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 200 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The fluid container 202 is of a regular geometry and contains fluid. In an example embodiment, the fluid container 202 is a rectangular box with 'D' as inner wall-to-wall distance and 'd' as wall thickness. The fluid container 202 is also equipped with one or more piezo electric transducers that are used for exciting the fluid kept in the fluid container 202. The piezo electric transducers present in the fluid container 202 are configured to generate one or more excitation signals and one or more corresponding quadrature signals by exciting the fluid with one or more frequencies associated with one or more random samples. In an embodiment, the one or more random samples are selected randomly from a plurality of samples available in a defined frequency scanning range of a full frequency sweep signal with defined frequency increment steps. The generated one or more excitation signals and the one or more corresponding quadrature signals are shared with the sound speed assessment system 206 using the network 204.

The sound speed assessment system 206 includes one or more hardware processors, such as hardware processors 304 and a memory, such as memory 302. The sound speed assessment system 206 is configured to perform one or more of the operations described herein. The sound speed assessment system 206 is configured to receive the one or more excitation signals and the one or more corresponding quadrature signals via the network 204 from the fluid container 202 containing the fluid. The sound speed assessment system 206 is then configured to create a pseudo analytic signal vector based, at least in part, on the one or more excitation signals and the one or more corresponding quadrature signals using a pre-defined vector creation formula. Once the pseudo analytic signal vector is created, the sound speed assessment system 206 is configured to estimate a pulse-echo view by applying a compressive sensing technique over the created pseudo analytic signal vector.

Thereafter, the sound speed assessment system 106 calculates the sound speed in the fluid based on the estimated pulse-echo view using the pre-defined sound speed calculation formula.

The number and arrangement of systems, containers, and/or networks shown in FIG. 2 are provided as an example. There may be additional systems, containers, and/or networks; fewer systems, containers, and/or networks; different systems, containers, and/or networks; and/or differently arranged systems, containers, and/or networks than those shown in FIG. 2.

Furthermore, two or more systems shown in FIG. 2 may be implemented within a single system or device, or a single system or device shown in FIG. 2 may be implemented as multiple, distributed systems or devices. Additionally, or alternatively, a set of systems (e.g., one or more systems) of the environment 200 may perform one or more functions described as being performed by another set of systems of the environment 200 (e.g., refer scenarios described above).

Figure 3:
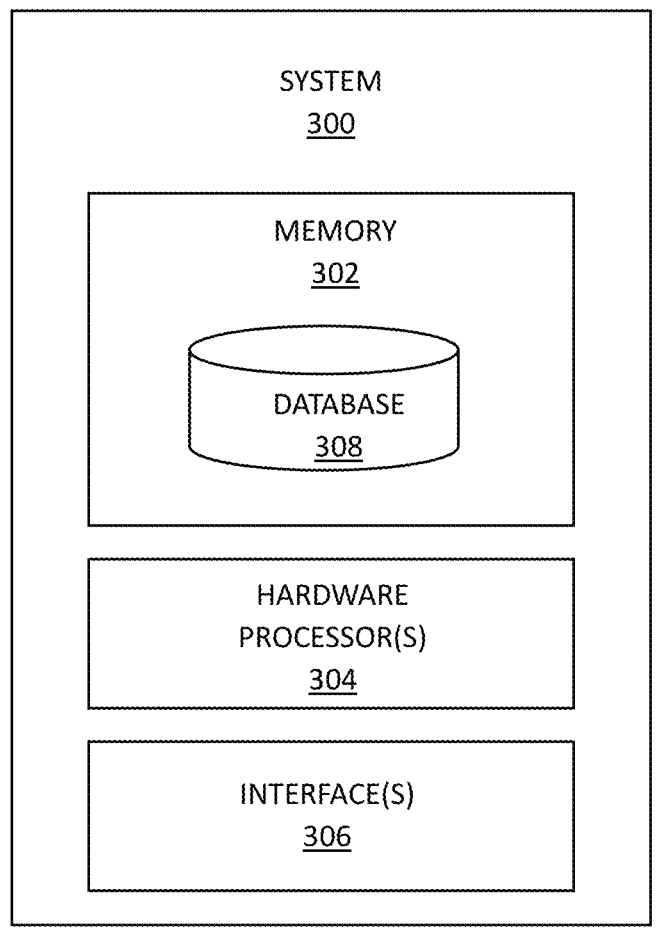
FIG. 3 illustrates an exemplary block diagram of a system for faster assessment of sound speed in fluids using compressive sensing technique, in accordance with an embodiment of the present disclosure.

FIG. 3 illustrates an exemplary block diagram of a sound speed assessment system 300 for faster assessment of sound speed in fluids using compressive sensing technique, in accordance with an embodiment of the present disclosure. In an embodiment, the sound speed assessment system 300 may also be referred as a system and may be interchangeably used herein. The system 300 is similar to the sound speed assessment system 206 explained with reference to FIG. 1. In some embodiments, the system 300 is embodied as a cloud-based and/or SaaS-based (software as a service) architecture. In some embodiments, the system 300 may be implemented in a server system. In some embodiments, the system 300 may be implemented in a variety of computing systems, such as laptop computers, notebooks, hand-held devices, workstations, mainframe computers, and the like.

In an embodiment, the system 300 includes one or more processors 304, communication interface device(s) or input/output (I/O) interface(s) 306, and one or more data storage devices or memory 302 operatively coupled to the one or more processors 304. The one or more processors 304 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The I/O interface device(s) 306 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 302 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 308 can be stored in the memory 302, wherein the database 308 may comprise, but are not limited to pre-defined formulas, such as a pre-defined vector creation formula, pre-defined sound speed calculation formula etc. In an embodiment, the memory 302 may store information about random frequencies that are selected, one or more algorithms for creation of matrices, such as Inverse Fast Fourier transform (IFFT) basis matrix, sensing matrix etc., pre-defined formulas, and the like. The memory 302 further comprises (or may further comprise) information pertaining to input(s)/output(s) of each step performed by the system and method of the present disclosure. In other words, input(s) fed at each step and output(s) generated at each step are comprised in the memory 302 and can be utilized in further processing and analysis.

Figure 4:
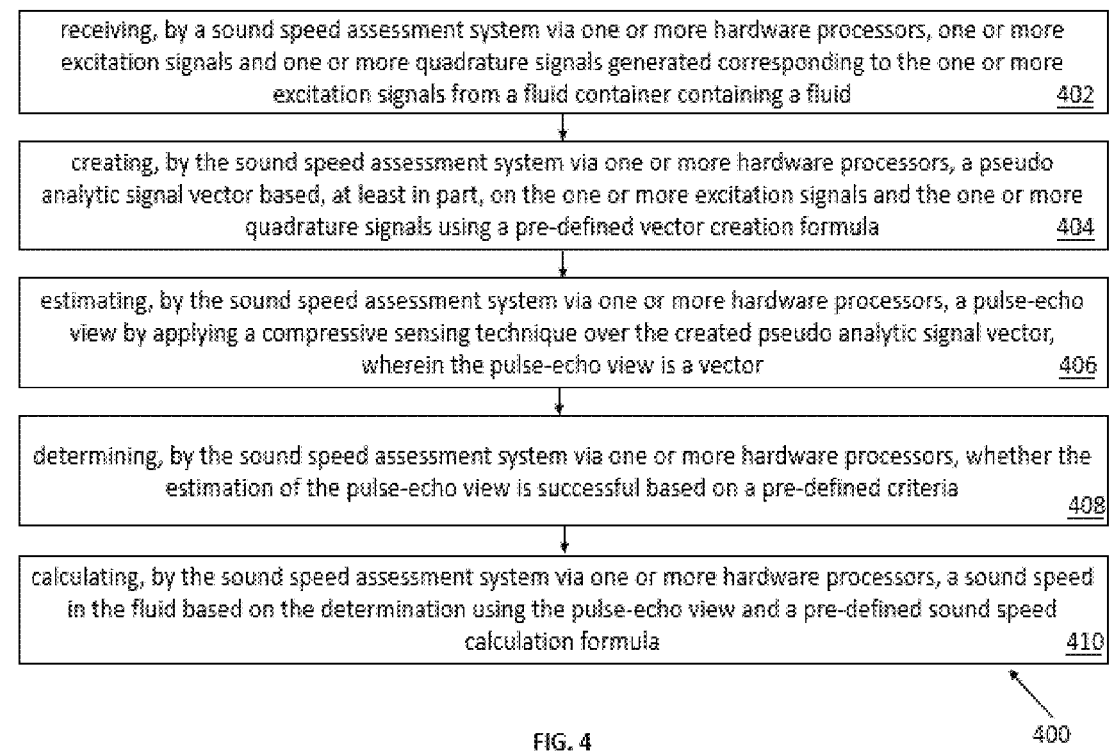
FIG. 4 illustrates an exemplary flow diagram of a method for faster assessment of sound speed in fluids using compressive sensing technique, in accordance with an embodiment of the present disclosure.

FIG. 4, with reference to FIGS. 2 and 3, illustrates an exemplary flow diagram of a method 400 for faster assessment of sound speed in fluids using compressive sensing technique, in accordance with an embodiment of the present disclosure. The method 400 may use the system 300 of FIG. 3 and sound speed assessment system 206 of FIG. 2 for execution. In an embodiment, the system 300 comprises one or more data storage devices or the memory 302 operatively coupled to the one or more hardware processors 304 and is configured to store instructions for execution of steps of the method 400 by the one or more hardware processors 304. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method 400 of the present disclosure will now be explained with reference to the components of the system 300 as depicted in FIG. 3, and the flow diagram.

In an embodiment of the present disclosure, at step 302, the one or more hardware processors 304 comprised in the system 300 receive one or more excitation signals and one or more quadrature signals generated corresponding to the one or more excitation signals from a fluid container, such as fluid container 102 containing a fluid. Examples of the fluid includes, but are not limited to, milk, oil, water, gasoline, alcohol etc. The above step 402 is better understood by way of following description.

As discussed previously, the fluid kept in the container is excited with a continuous wave and its frequency is stepped through in time over a frequency range for creating resonance in the standard SFAI technique. In the present disclosure, one or more random samples are selected from a plurality of samples available in a defined frequency scanning range of a full frequency sweep signal that is used to excite the fluid.

Before making the selection of one or more random samples, a start ($f_{start}$) and a stop ($f_{stop}$) frequency scanning range of a frequency sweep signal is defined. Thereafter, frequency increment step ($\Delta$) is defined as required resolution of the full frequency sweep signal. It should be noted that the start and stop frequency scanning range and the frequency increment step can be defined by an administrator or user of the system 300. Further, number of frequency probing points N are calculated by using equation:

$$N = (f_{stop} - f_{start})/\Delta$$

The calculation of the number of frequency probing points helps in identification of the number of frequency points that need to be excited for creating the resonance condition. Once the N is available, number of intended frequency measurement points P i.e., random samples that are to be selected are defined among the N frequency probing points such that P is very smaller than N.

Further, for selecting P random samples, first a numeric array F is created from the $f_{start}$ till $f_{stop}$ with a gap of $\Delta$ steps. For example, if $f_{start}$ is defined as 2 MHz, $f_{stop}$ is defined as 50 MHz, and $\Delta$ is defined as 0.5, then F may contain values such as $\{2, 2.5, 3, 3.5 \ldots, 50\}$. Thereafter, P number of random samples are selected from F and the frequency values of P random samples are also noted in an array Fr.

Once the F, is available, the frequencies available in F, of P random samples are excited sequentially to generate the one or more excitation signals (i.e., I values) and the one or more quadrature signals (i.e., Q values) generated corresponding to the one or more excitation signals. The generated I and Q are then shared with the system 300 using the network 104.

At step 404 of the present disclosure, the one or more hardware processors 304 of the system 300 create a pseudo analytic signal vector based, at least in part, on the one or more excitation signals and the one or more quadrature signals using a pre-defined vector creation formula.

As already explained previously, the pseudo analytical signal $Z_r$ is formed by combining the I and Q using the pre-defined vector creation formula as:

$$Z_r = jZ^*$$

Where $Z = I + jQ$, and I and Q has length of P.

This is to note that $Z_r$ is a small subset of $Z_c$ as $Z_r$ contains some random measurements by exciting frequencies from Fr, whereas $Z_c$ is representative of high resolution standard SFAI measurement. The pre-defined vector creation formula is used to create the pseudo analytic signal vector $Z_r$ of P×1 dimension (that has combined essence of I and Q). $Z_r$ denote the randomly measured values.

At step 406 of the present disclosure, the one or more hardware processors 304 of the system 300 estimate a pulse-echo view by applying a compressive sensing technique over the created pseudo analytic signal vector. The pulse-echo view is a vector. The above step 406 is better understood by way of following description.

As the above step is based on the compressive sensing technique, the technique in explained first as it forms the basis of this step.

The term 'compressive sensing' refers to a technique where well-known Shanon-Nyquist data rate/sampling rate limit can be overcome for signals that have sparse representation in some domain. In a simplified manner, compressive sensing technique can reconstruct original signals from very sparsely sampled data in which points are far below the usual Shanon-Nyquist rate.

So, for estimating the pulse echo view using the compressive sensing technique, the one or more hardware processors 304 of the system 300 first create an IFFT basis matrix $\Psi^{-1}$ for a compressive sensing computation. The dimension of the IFFT basis matrix $\Psi^{-1}$ is same as number of the full frequency sweep samples or the number of frequency probing points i.e., $\Psi^{-1}{}_{N \times N}$. Thereafter, the one or more hardware processors 304 of the system 300 generate a sensing matrix $A_{P \times N}$ by selecting one or more random rows in the IFFT basis matrix $\Psi^{-1}{}_{N \times N}$. In an embodiment, the number of the one or more random rows that are selected in the IFFT basis matrix $\Psi^{-1}{}_{N \times N}$ depends on the number of the one or more random samples P that are selected from the plurality of samples. So, $\Psi^{-1}{}_{P \times N}$ matrix (also refereed as sensing matrix $A_{P \times N}$) is created from the IFFT basis matrix $\Psi^{-1}{}_{N \times N}$ and mathematically $A_{P \times N}$ can be represented as:

$$A_{P \times N} = \varphi \Psi^{-1},$$

where $\varphi$ represents random sampling matrix.

As per our previous discussion, $Z_r$ can be represented as:

$$Z_r = A_{P \times N} * x$$

For further simplification it can be written as:

$$Z_r = Ax \text{ (also referred as optimization equation)},$$

Where x is to be estimated from sensing matrix $A_{P \times N}$ and $Z_r$.

Further, the one or more hardware processors 304 of the system 300 creates a weighted diagonal matrix W by assigning one or more weights in one or more diagonal elements of the weighted diagonal matrix W. In an embodiment, the dimension of the weighted diagonal matrix W is same as the number of the full frequency sweep samples. So, the $W_{N \times N}$ matrix is created. The creation of the weighted diagonal matrix $W_{N \times N}$ is explained by way of following description.

To create the weighted diagonal matrix W, the one or more hardware processors 304 of the system 300 first create a random sampling matrix by randomly selecting (or picking) frequencies from the IFFT basis matrix $\Psi^{-1}{}_{N \times N}$. In an embodiment, the number of rows in the random sampling matrix are equal to the number of random frequencies chosen for excitation and the number of columns in the random sampling matrix are same as the dimension of the IDFT basis matrix. The one or more hardware processors 304 of the system 300 then compute a pseudo-inverse of the created random sampling matrix. Thereafter, the one or more hardware processors 304 of the system 300 obtain one or more weight products by computing product of the computed pseudo-inverse with each quadrature signal of the one or more quadrature signals. Further, the one or more hardware processors 304 of the system 300 obtain one or more weights by (i) performing inversion of each of the one or more weight products to obtain one or more inverted weight products and (ii) computing absolute of the one or more inverted weight products to obtain the one or more weights. Once the one or more weights are available, the one or more hardware processors 304 of the system 300 create the weighted diagonal matrix by assigning the one or more weights in the one or more diagonal elements of the weighted diagonal matrix W.

Once the weighted diagonal matrix is created, the one or more hardware processors 304 of the system 300 creates an optimization equation $Z_r = Ax$ using the sensing matrix A (as explained previously) and an optimization problem using the weighted diagonal matrix W and the optimization equation as:

$$\hat{x} = \min \|Wx\|_{l_1} \text{ such that } Z_r = Ax$$

Where $\hat{x}$ represents pulse-echo view or time-domain view i.e., estimation for x. Additionally, W can be calculated as:

$$W = |1/A^+ Z_r|,$$

Where $A^+ = (A^H A)^{-1} A^H$ and
$A^H$ represents Hermitian of the matrix.

Further, the one or more hardware processors 304 of the system 300 estimate the pulse-echo view $\hat{x}$ by solving the optimization problem using a norm minimization. In other words, value of x that solves the optimization problem is considered as the pulse-echo view $\hat{x}$. In an embodiment, the norm minimization is an /1 norm minimization. The norm minimization is used to obtain the sparse solution.

At step 408 of the present disclosure, the one or more hardware processors 304 of the system 300 determine whether the estimation of the pulse-echo view is successful based on a pre-defined criteria. In an embodiment, the pre-defined criteria include checking whether $\hat{x}$ values are lower than a predefined threshold value. In an embodiment, predefined threshold value can be ½0th of excitation voltage. If the $\hat{x}$ values are found to be greater than the predefined threshold value, the estimation of the pulse-echo view will be considered as successful otherwise the pulse-echo view is considered as unsuccessful. In case the estimation of the pulse-echo view is found to be successful, the step 410 is performed otherwise new one or more new random samples are selected (e.g., such new random samples may be selected by the user of the system 300) from the plurality of samples available in the defined frequency scanning range. The one or more new random samples are different from the previously selected one or more random samples. The step 402 to 408 will again be performed till the estimation of the pulse-echo view will be considered as successful.

In an embodiment, at step 410 of the present disclosure, the one or more hardware processors 304 of the system 300 calculate the sound speed in the fluid based on the determination using the pulse-echo view and the pre-defined sound speed calculation formula. The above step 410 is better understood by way of following description.

Upon determining that the estimation of the pulse-echo view is successful, the one or more hardware processors 304 of the system 300 perform normalization of magnitude of the pulse-echo view to obtain a normalized pulse-echo view. In an embodiment, the normalization is performed by dividing the entire signal x by max (x). The one or more hardware processors 304 of the system 300 then determines first two lead peaks in the normalized pulse-echo view. An example graphical representation of the pulse-echo view is shown with reference to FIG. 6. Once the information about two lead peaks is available, the one or more hardware processors 304 of the system 300 determines time position of each of the two lead peaks. In an embodiment, the time position of first lead peak can be represented as $T_1$. Similarly, the time position of second lead peak can be represented as $T_2$.

Thereafter, the one or more hardware processors 304 of the system 300 calculate the sound speed in the fluid $v_{liquid}$ based, at least in part on, the time position of each of the two lead peaks and an inner wall diameter of the fluid container using the pre-defined sound speed calculation formula i.e., $$v_{liquid} = \frac{2 * D}{T_2 - T_1}.$$

As discussed earlier, SFAI data in TTD approach produces pulse-echo view which is sparse in nature as time pulses arrive only in certain time points. So, one can take pulse-echo view as the sparse representation of the original SFAI frequency spectra. More specifically, the time-domain view is sparse compared to the frequency domain view and thus compressive sensing can be used for this sparse representation.

Figure 5:
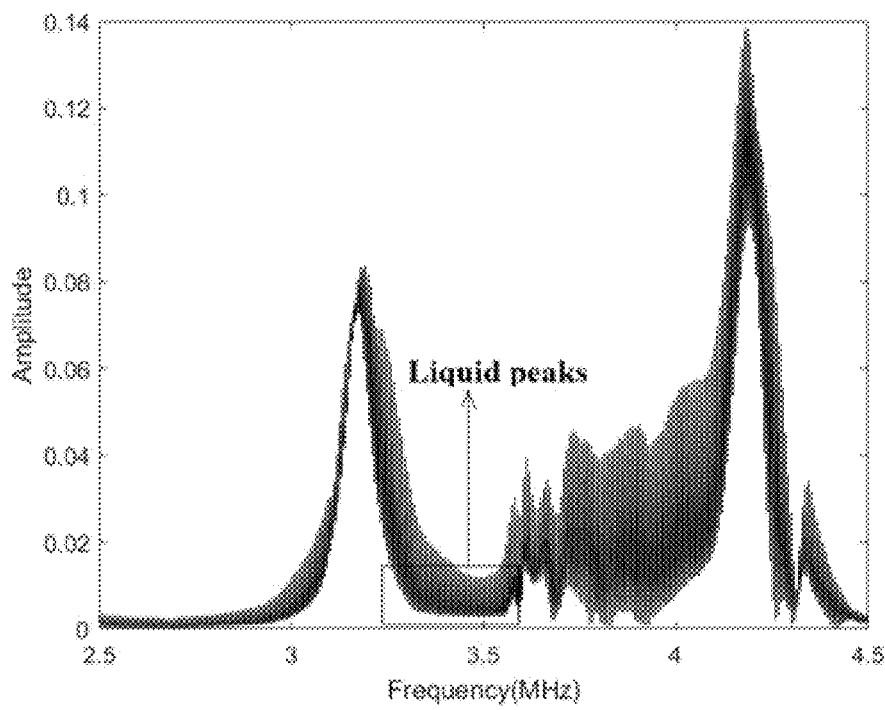
FIG. 5 illustrates an example graphical representation of a magnitude response of a high-resolution frequency sweep data, in accordance with an embodiment of the present disclosure.

FIG. 5, with reference to FIGS. 1 through 4, illustrates an example graphical representation of a magnitude response of a high resolution frequency sweep data, in accordance with an embodiment of the present disclosure.

As seen in the FIG. 5, fluid peaks are clearly visible in a zoomed inset with consecutive peak to peak distance ($\Delta f$) as 7000 Hz.

Figure 6:
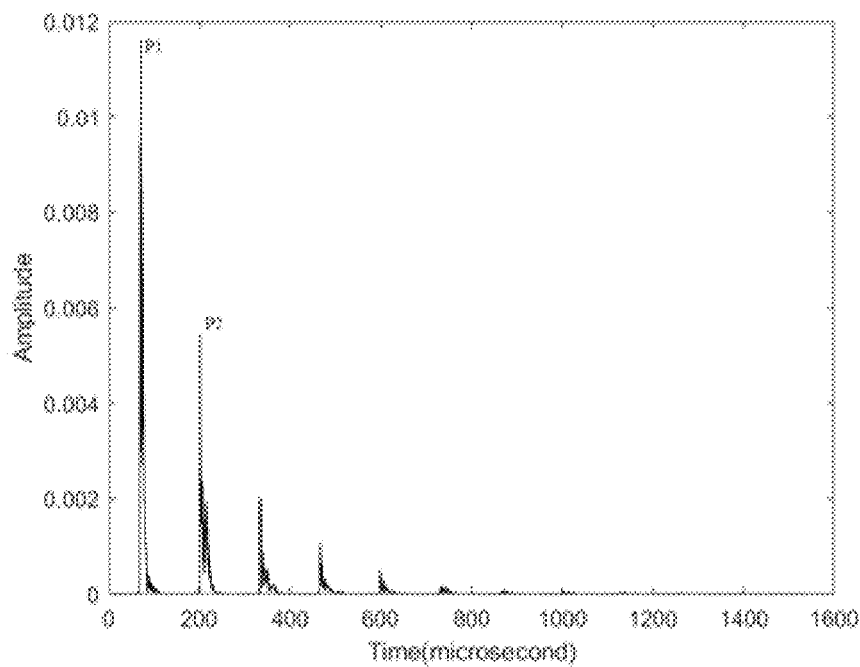
FIG. 6 is an example graphical representation of a pulse-echo view created when Inverse Fast Fourier transform is applied over a pseudo analytical signal, in accordance with an embodiment of the present disclosure.

FIG. 6, with reference to FIGS. 1 through 5, illustrates an example graphical representation of a pulse-echo view created when FFT is applied over a pseudo analytical signal, in accordance with an embodiment of the present disclosure.

As seen in the FIG. 6, the graphical representation of the pulse echo-view shows arrival of impulses at a receiver piezo at different time instances as expected. Further, it can be observed that each pulse group is consisted of a lead pulse followed by shoulder pulses. In an embodiment, the shoulder pulses represent echos that took place in the wall material whereas lead pulse of each group of pulses represents pulse going back and forth in the fluid. The pulse strength monotonically decreases due to attenuation of sound attenuation in materials.

Figure 7A:
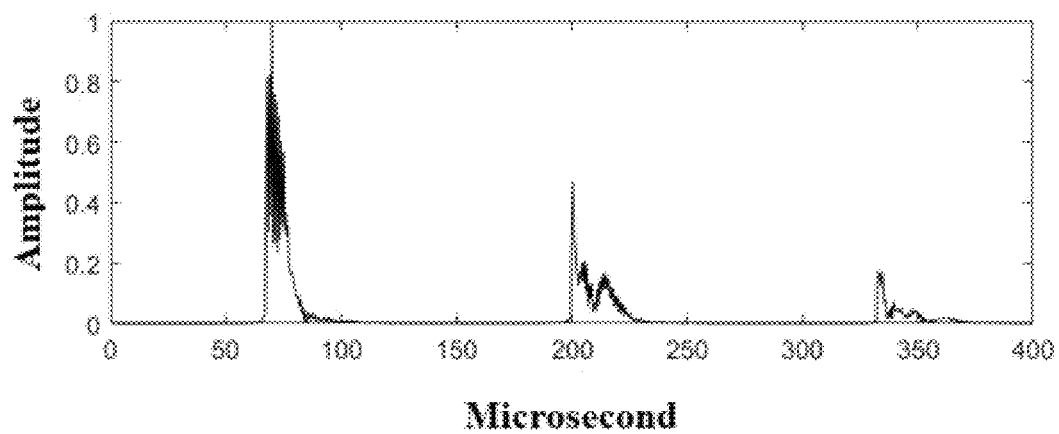
FIG. 7A is a graphical representation of a pulse-echo view created for an original high-resolution spectra using standard Swept Frequency Acoustic Interferometry (SFAI) technique, in accordance with an embodiment of the present disclosure.

FIG. 7A is a graphical representation of a pulse-echo view created for an original high resolution spectra using standard SFAI technique, in accordance with an embodiment of the present disclosure. The pulse-echo view presented in FIG. 7A is created using 6400 frequency probing points.

Figure 7B:
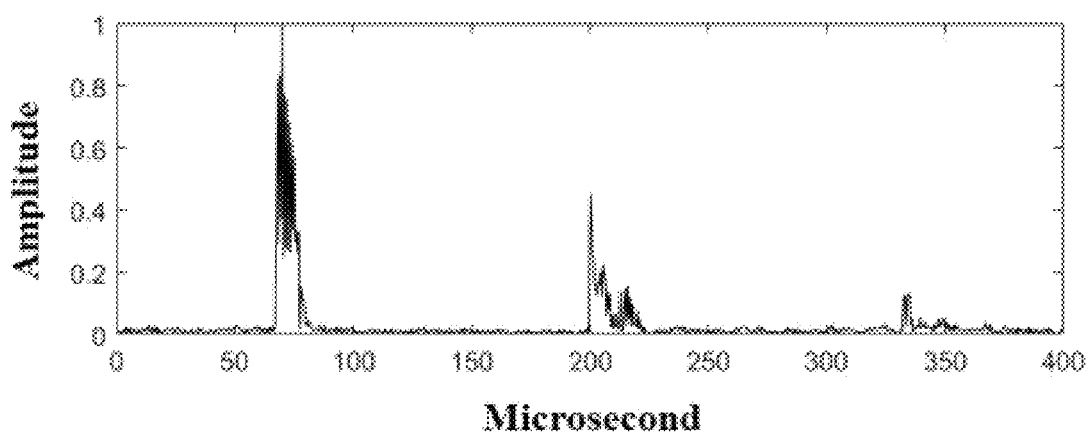
FIG. 7B is a graphical representation of a reconstructed pulse-echo view for original high-resolution spectra using compressive sensing technique based reconstruction with less number of frequency probing points, in accordance with an embodiment of the present disclosure.

FIG. 7B is a graphical representation of a reconstructed pulse-echo view for the original high resolution spectra using compressive sensing technique based reconstruction with less number of frequency probing points, in accordance with an embodiment of the present disclosure.

As seen in FIG. 7B, the pulse-echo view reconstructed using 2048 frequency probing points is almost similar to the pulse-echo view created using 6400 frequency probing points. The sound speed calculation from 6400 point using standard SFAI yields sound speed as 1539.6 m/s whereas the compressive SFAI with 2048 points also yields same sound speed of 1539.6 m/s. Thus, making it more than three times faster than the standard SFAI technique while yielding the same resolution. In addition, the amount of I and Q data that needs to be stored is three times less than the usual data that is stored in case of standard SFAI. Further, when the sound speed calculation is done with only 256 point using the compressive SFAI, the obtained sound is still found to be 1539.6 m/s thus making it 25 times faster than the standard SFAI while storing 25 times less I and Q data as compare to regular SFAI.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, the Swept Frequency Acoustic Interferometry (SFAI) is widely being used as a major noninvasive measurement tool for characterizing fluids. The SFAI uses a narrowband filtering to significantly enhance the signal quantity as compared to traditional pulse-echo based measurements. However, SFAI technique is relatively slow in measurement as there is a need to sweep a wide range of frequencies. To overcome the disadvantages, embodiments of the present disclosure provide a method and a system for faster assessment of sound speed in fluids using compressive sensing technique. More specifically, the system assesses sound speed in liquid by applying compressive sensing technique over the standard SFAI, thus significantly reducing the frequency scanning time required to generate the SFAI data thereby making the measurement significantly faster over standard SFAI scan-based measurements. The system uses a very few frequency excitation points (way below the Nyquist rate for the spectrum) and still able to reconstruct a very high resolution pulse-echo view (x) as if a full high resolution frequency sweep has been performed, thereby saving significant amount of sweep time without loss of any information.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, by a sound speed assessment system via one or more hardware processors, one or more excitation signals and one or more quadrature signals generated corresponding to the one or more excitation signals from a fluid container containing a fluid, wherein the fluid container is with an inner wall-to-wall distance 'D', a wall thickness 'd' and equipped with one or more piezo electric transducers placed outside a container wall of the fluid container, for exciting the fluid kept in the fluid container, wherein the one or more piezo electric transducers generate the one or more excitation signals and corresponding one or more quadrature signals by exciting the fluid with one or more frequencies associated with one or more random samples,
transmitting the generated one or more excitation signals and the one or more corresponding quadrature signals to the sound speed assessment system using a network that is coupled to and in communication with the sound speed assessment system and the fluid container;
creating, by the sound speed assessment system via the one or more hardware processors, a pseudo analytic signal vector based, at least in part, on the one or more excitation signals and the one or more quadrature signals using a pre-defined vector creation formula;
estimating, by the sound speed assessment system via the one or more hardware processors, a pulse-echo view by applying a compressive sensing technique over the created pseudo analytic signal vector and the compressive sensing technique reconstruct the pulse-echo view for an original high-resolution spectra, wherein the pulse-echo view is a vector;
determining, by the sound speed assessment system via the one or more hardware processors, whether the estimation of the pulse-echo view is successful based on a pre-defined criteria; and
calculating, by the sound speed assessment system via the one or more hardware processors, a sound speed in the fluid based on the determination using the pulse-echo view and a pre-defined sound speed calculation formula.

2. The processor implemented method of claim 1, wherein the step of estimating, by the sound speed assessment system via the one or more hardware processors, the pulse-echo view by applying the compressive sensing technique over the created pseudo analytic signal vector comprises:
creating, by the sound speed assessment system via the one or more hardware processors, an Inverse Fast Fourier transform (IFFT) basis matrix for a compressive sensing computation, wherein dimension of the IFFT basis matrix is same as number of the full frequency sweep samples;
generating, by the sound speed assessment system via the one or more hardware processors, a sensing matrix by selecting one or more random rows in the IFFT basis matrix, wherein number of the one or more random rows that are selected depends on the number of the one or more random samples that are selected from the plurality of samples;
creating, by the sound speed assessment system via the one or more hardware processors, a weighted diagonal matrix by assigning one or more weights in one or more diagonal elements of the weighted diagonal matrix, wherein dimension of the weighted diagonal matrix is same as the number of the plurality of samples;
creating, by the sound speed assessment system via the one or more hardware processors, an optimization equation using the sensing matrix and an optimization problem using the weighted diagonal matrix and the optimization equation; and
estimating, by the sound speed assessment system via the one or more hardware processors, the pulse-echo view by solving the optimization problem using a norm minimization.

3. The processor implemented method of claim 2, wherein the step of creating, by the sound speed assessment system via the one or more hardware processors, the weighted diagonal matrix by assigning one or more weights in one or more diagonal elements of the weighted diagonal matrix comprises:
creating, by the sound speed assessment system via the one or more hardware processors, a random sampling matrix by randomly selecting frequencies from the IFFT basis matrix;
computing, by the sound speed assessment system via the one or more hardware processors, a pseudo-inverse of the created random sampling matrix;
obtaining, by the sound speed assessment system via the one or more hardware processors, one or more weight products by computing product of the computed pseudo-inverse with each quadrature signal of the one or more quadrature signals;
obtaining, by the sound speed assessment system via the one or more hardware processors, one or more weights by:
performing, by the sound speed assessment system via the one or more hardware processors, inversion of each of the one or more weight products to obtain one or more inverted weight products; and
computing, by the sound speed assessment system via the one or more hardware processors, absolute of the one or more inverted weight products to obtain the one or more weights; and
creating, by the sound speed assessment system via the one or more hardware processors, weighted diagonal matrix by assigning the one or more weights in the one or more diagonal elements of the weighted diagonal matrix.

4. The processor implemented method of claim 2, wherein the pre-defined criteria comprise considering the pulse-echo view as successful if vector value of the pulse-echo view is greater than a predefined threshold value otherwise considering the pulse-echo view as unsuccessful.

5. The processor implemented method of claim 4, wherein upon determining that the pulse-echo view is unsuccessful, selecting one or more new random samples from the plurality of samples available in the defined frequency scanning range, and wherein the one or more new random samples are different from the one or more random samples.

6. The processor implemented method of claim 1, wherein the step of calculating, by the sound speed assessment system via the one or more hardware processors, the sound speed in the fluid based on the determination using the pulse-echo view and a pre-defined sound speed calculation formula comprises:
   performing, by the sound speed assessment system via the one or more hardware processors, normalization of magnitude of the pulse-echo view to obtain a normalized pulse-echo view;
   determining, by the sound speed assessment system via the one or more hardware processors, first two lead peaks in the normalized pulse-echo view;
   determining, by the sound speed assessment system via the one or more hardware processors, time position of each of the two lead peaks; and
   calculating, by the sound speed assessment system via the one or more hardware processors, the sound speed in the fluid based, at least in part on, the time position of each of the two lead peaks and an inner wall diameter of the fluid container using the pre-defined sound speed calculation formula.

7. A sound speed assessment system, comprising:
   a memory storing instructions;
   one or more communication interfaces; and
   one or more hardware processors coupled to the memory via the one or more communication interfaces, wherein the one or more hardware processors are configured by the instructions to:
   receive one or more excitation signals and one or more quadrature signals generated corresponding to the one or more excitation signals from a fluid container containing a fluid, wherein the fluid container is with an inner wall-to-wall distance 'D', a wall thickness 'd' and equipped with one or more piezo electric transducers placed outside a container wall of the fluid container, for exciting the fluid kept in the fluid container, wherein the one or more piezo electric transducers generate the one or more excitation signals and corresponding one or more quadrature signals by exciting the fluid with one or more frequencies associated with one or more random samples,
   transmitting the generated one or more excitation signals and the one or more corresponding quadrature signals to the sound speed assessment system using a network that is coupled to and in communication with the sound speed assessment system and the fluid container;
   create a pseudo analytic signal vector based, at least in part, on the one or more excitation signals and the one or more quadrature signals using a pre-defined vector creation formula;
   estimate a pulse-echo view by applying a compressive sensing technique over the created pseudo analytic signal vector and the compressive sensing technique reconstruct the pulse-echo view for an original high-resolution spectra, wherein the pulse-echo view is a vector;
   determine whether the estimation of the pulse-echo view is successful based on a pre-defined criteria; and
   calculate a sound speed in the fluid based on the determination using the pulse-echo view and a pre-defined sound speed calculation formula.

8. The system as claimed in claim 7, wherein the step of estimating, by the sound speed assessment system via the one or more hardware processors, the pulse-echo view by applying the compressive sensing technique over the created pseudo analytic signal vector comprises:
   creating an Inverse Fast Fourier transform (IFFT) basis matrix for a compressive sensing computation, wherein dimension of the IFFT basis matrix is same as number of the full frequency sweep samples;
   generating a sensing matrix by selecting one or more random rows in the IFFT basis matrix, wherein number of the one or more random rows that are selected depends on the number of the one or more random samples that are selected from the plurality of samples;
   creating a weighted diagonal matrix by assigning one or more weights in one or more diagonal elements of the weighted diagonal matrix, wherein dimension of the weighted diagonal matrix is same as the number of the plurality of samples;
   creating an optimization equation using the sensing matrix and an optimization problem using the weighted diagonal matrix and the optimization equation; and
   estimating the pulse-echo view by solving the optimization problem using a norm minimization.

9. The system as claimed in claim 8, wherein the step of creating, by the sound speed assessment system via the one or more hardware processors, the weighted diagonal matrix by assigning one or more weights in one or more diagonal elements of the weighted diagonal matrix comprises:
   creating a random selection matrix by randomly selecting frequencies from the IFFT basis matrix;
   computing a pseudo-inverse of the created random selection matrix;
   obtaining one or more weight products by computing product of the computed pseudo-inverse with each quadrature signal of the one or more quadrature signals;
   obtaining one or more weights by:
      performing inversion of each of the one or more weight products to obtain one or more inverted weight products; and
      computing absolute of the one or more inverted weight products to obtain the one or more weights; and
   creating weighted diagonal matrix by assigning the one or more weights in the one or more diagonal elements of the weighted diagonal matrix.

10. The system as claimed in claim 8, wherein the pre-defined criteria comprise considering the pulse-echo view as successful if vector value of the pulse-echo view is greater than a predefined threshold value otherwise considering the pulse-echo view as unsuccessful.

11. The system as claimed in claim 10, wherein upon determining that the pulse-echo view is unsuccessful, selecting, by the sound speed assessment system via the one or more hardware processors, one or more new random samples from the plurality of samples available in the defined frequency scanning range, and wherein the one or more new random samples are different from the one or more random samples.

12. The system as claimed in claim 7, wherein the step of calculating, by the sound speed assessment system via the one or more hardware processors, the sound speed in the fluid based on the determination using the pulse-echo view and a pre-defined sound speed calculation formula comprises:

performing normalization of magnitude of the pulse-echo view to obtain a normalized pulse-echo view;
determining first two lead peaks in the normalized pulse-echo view;
determining time position of each of the two lead peaks; and
calculating the sound speed in the fluid based, at least in part on, the time position of each of the two lead peaks and an inner wall diameter of the fluid container using the pre-defined sound speed calculation formula.

13. One or more non-transitory machine-readable information storage mediums comprising one or more instructions which when executed by one or more hardware processors cause:
receiving, by a sound speed assessment system, one or more excitation signals and one or more quadrature signals generated corresponding to the one or more excitation signals from a fluid container containing a fluid, wherein the fluid container is with an inner wall-to-wall distance 'D', a wall thickness 'd' and equipped with one or more piezo electric transducers placed outside a container wall of the fluid container, for exciting the fluid kept in the fluid container, wherein the one or more piezo electric transducers generate the one or more excitation signals and corresponding one or more quadrature signals by exciting the fluid with one or more frequencies associated with one or more random samples,
transmitting the generated one or more excitation signals and the one or more corresponding quadrature signals to the sound speed assessment system using a network that is coupled to and in communication with the sound speed assessment system and the fluid container;
creating, by the sound speed assessment system, a pseudo analytic signal vector based, at least in part, on the one or more excitation signals and the one or more quadrature signals using a pre-defined vector creation formula;
estimating, by the sound speed assessment system, a pulse-echo view by applying a compressive sensing technique over the created pseudo analytic signal vector and the compressive sensing technique reconstruct the pulse-echo view for an original high-resolution spectra, wherein the pulse-echo view is a vector;
determining, by the sound speed assessment system, whether the estimation of the pulse-echo view is successful based on a pre-defined criteria; and
calculating, by the sound speed assessment system, a sound speed in the fluid based on the determination using the pulse-echo view and a pre-defined sound speed calculation formula.

14. The one or more non-transitory machine-readable information storage mediums of claim 13, wherein the step of estimating, by the sound speed assessment system the pulse-echo view by applying the compressive sensing technique over the created pseudo analytic signal vector comprises:
creating, by the sound speed assessment system, an Inverse Fast Fourier transform (IFFT) basis matrix for a compressive sensing computation, wherein dimension of the IFFT basis matrix is same as number of the full frequency sweep samples;
generating, by the sound speed assessment system, a sensing matrix by selecting one or more random rows in the IFFT basis matrix, wherein number of the one or more random rows that are selected depends on the number of the one or more random samples that are selected from the plurality of samples;
creating, by the sound speed assessment system, a weighted diagonal matrix by assigning one or more weights in one or more diagonal elements of the weighted diagonal matrix, wherein dimension of the weighted diagonal matrix is same as the number of the plurality of samples;
creating, by the sound speed assessment system, an optimization equation using the sensing matrix and an optimization problem using the weighted diagonal matrix and the optimization equation; and
estimating, by the sound speed assessment system, the pulse-echo view by solving the optimization problem using a norm minimization.

15. The one or more non-transitory machine-readable information storage mediums of claim 14, wherein the step of creating, by the sound speed assessment system, the weighted diagonal matrix by assigning one or more weights in one or more diagonal elements of the weighted diagonal matrix comprises:
creating, by the sound speed assessment system, a random sampling matrix by randomly selecting frequencies from the IFFT basis matrix;
computing, by the sound speed assessment system, a pseudo-inverse of the created random sampling matrix;
obtaining, by the sound speed assessment system, one or more weight products by computing product of the computed pseudo-inverse with each quadrature signal of the one or more quadrature signals;
obtaining, by the sound speed assessment system, one or more weights by:
performing, by the sound speed assessment system, inversion of each of the one or more weight products to obtain one or more inverted weight products; and
computing, by the sound speed assessment system, absolute of the one or more inverted weight products to obtain the one or more weights; and
creating, by the sound speed assessment system, weighted diagonal matrix by assigning the one or more weights in the one or more diagonal elements of the weighted diagonal matrix.

16. The one or more non-transitory machine-readable information storage mediums of claim 14, wherein the pre-defined criteria comprise considering the pulse-echo view as successful if vector value of the pulse-echo view is greater than a predefined threshold value otherwise considering the pulse-echo view as unsuccessful.

17. The one or more non-transitory machine-readable information storage mediums of claim 16, wherein upon determining that the pulse-echo view is unsuccessful, selecting one or more new random samples from the plurality of samples available in the defined frequency scanning range, and wherein the one or more new random samples are different from the one or more random samples.

\* \* \* \* \*